(12) United States Patent
Chen et al.

(10) Patent No.: US 12,554,624 B2
(45) Date of Patent: Feb. 17, 2026

(54) AUTOMATION TEST SCRIPT GENERATION (71) Applicant: International Business Machines Corporation, Armonk, NY (US)

(72) Inventors: Dong Chen, Beijing (CN); Jia Chan Shen, Ningbo (CN); Ju Ling Liu, Beijing (CN); Ting Ting Zhan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 18/363,777

(22) Filed: Aug. 2, 2023

(65) Prior Publication Data

US 2025/0045190 A1    Feb. 6, 2025

(51) Int. Cl.
| | |
|---|---|
| *G06F 11/36* | (2025.01) |
| *G06F 8/65* | (2018.01) |
| *G06F 11/3668* | (2025.01) |
| *G06F 11/3698* | (2025.01) |
| G06F 11/3604 | (2025.01) |

(52) U.S. Cl.
CPC ...... *G06F 11/3684* (2013.01); *G06F 11/3698* (2025.01); *G06F 11/3612* (2013.01); *G06F 11/3668* (2013.01); *G06F 11/3676* (2013.01)

(58) Field of Classification Search
CPC ............. G06F 11/3684; G06F 11/3698; G06F 11/3612; G06F 11/3668; G06F 11/3688; G06F 11/3664; G06F 11/3676
See application file for complete search history.

(56) References Cited

U.S. PATENT DOCUMENTS

| | | | |
|---|---|---|---|
| 10,114,738 B2 | 10/2018 | Dsouza | |
| 10,552,299 B1* | 2/2020 | Surace | ............... G06F 11/3684 |
| 10,642,721 B2 | 5/2020 | Kulkarni | |

(Continued)

FOREIGN PATENT DOCUMENTS

| | | |
|---|---|---|
| CN | 107861872 A | 3/2018 |
| CN | 108459850 B | 7/2021 |
| CN | 115048313 A | 9/2022 |

OTHER PUBLICATIONS

Chunhui Wang et al., Automatic Generation of System Test Cases from Use Case Specifications, Jul. 13-17, 2015, [Retrieved on Jul. 17, 2025]. Retrieved from the internet: <URL: https://dl.acm.org/doi/pdf/10.1145/2771783.2771812> 12 Pages (385-396) (Year: 2015).*

(Continued)

*Primary Examiner* — Anibal Riveracruz
(74) *Attorney, Agent, or Firm* — Joseph P. Curcuru (57) ABSTRACT

A computer-implemented method, a computer system, and a computer program product for generating an automation test script. Existing testing documents of a product under test can be acquired. A testing topology describing steps, containers, elements and actions of the test can be generated by extracting keywords in the existing test documents, wherein each element defines a user interface (UI) element of the product, each action defines an action attribute for an associated UI element, each container defines an operation area containing one or more UI elements, and each step defines one or more operations for one or more actions associated with one or more UI elements. An automation test script for the product can be generated based on the testing topology.

20 Claims, 7 Drawing Sheets

(56) References Cited

U.S. PATENT DOCUMENTS

| | | |
|---|---|---|
| 11,436,128 B2 | 9/2022 | Elking |
| 12,278,751 B2 * | 4/2025 | Tahvili .................. G06F 11/3698 |
| 2008/0072100 A1 * | 3/2008 | Okada .................. G06F 11/3414 |
| | | 714/E11.193 |
| 2011/0088018 A1 * | 4/2011 | Foley .................. G06F 11/3684 |
| | | 717/124 |
| 2018/0267887 A1 * | 9/2018 | Dsouza ............... G06F 11/3688 |
| 2019/0278699 A1 * | 9/2019 | Sharma .................. G06F 9/451 |
| 2021/0216442 A1 * | 7/2021 | Bhadani .............. G06F 11/3684 |
| 2023/0308381 A1 * | 9/2023 | Tahvili .................... H04L 41/16 |

OTHER PUBLICATIONS

Prerana Pradeepkumar Rane, Automatic Generation of Test Cases for Agile using Natural Language Processing, 2017, [Retrieved on Sep. 24, 2025]. Retrieved from the internet: <URL: https://vtechworks.lib.vt.edu/server/api/core/bitstreams/818b53ce-fc6e-473f-81a6-96cd4d1882bd/content> 97 Pages (1-97) (Year: 2017).*

* cited by examiner

AUTOMATION TEST SCRIPT GENERATION

BACKGROUND

The present disclosure relates to automation tests, and more specifically, to automation test script generation.

In recent years, the proportion of automation in our daily work is getting higher and higher, which greatly improves the work efficiency. The same is true for the testing work for products under development, wherein an automation test is one of the important parts during a lifecycle of the product development. The automation test is a type of software testing that involves execution of automation test scripts using an automation tool and thus automates the manual testing process.

However, the automation test scripts still need to be created by product developers or test engineers manually, which requires significant time and effort. In case of any changes in the product under development, there is also a requirement for increased efforts in updating the automation test scripts manually. At least for the above reasons, the testing work for the product under development has not been fully automated. In view of this, how to generate automation test scripts in an automatic and efficient way is challenging to the product developers or test engineers.

SUMMARY

According to one embodiment of the present disclosure, there is provided a computer-implemented method for generating an automation test script. Existing testing documents of a product under test can be acquired. A testing topology describing steps, containers, elements and actions of the test can be generated by extracting keywords in the existing test documents, wherein each element defines a user interface (UI) element of the product, each action defines an action attribute for an associated UI element, each container defines an operation area containing one or more UI elements, and each step defines one or more operations for one or more actions associated with one or more UI elements. An automation test script for the product can be generated based on the testing topology.

According to another embodiment of the present disclosure, there is provided a system for generating an automation test script. The system comprises one or more processors, a memory coupled to at least one of the processors and a set of computer program instructions stored in the memory. When executed by at least one of the processors, the set of computer program instructions perform following actions. Existing testing documents of a product under test can be acquired. A testing topology describing steps, containers, elements and actions of the test can be generated by extracting keywords in the existing test documents, wherein each element defines a user interface (UI) element of the product, each action defines an action attribute for an associated UI element, each container defines an operation area containing one or more UI elements, and each step defines one or more operations for one or more actions associated with one or more UI elements. An automation test script for the product can be generated based on the testing topology.

According to a yet another embodiment of the present disclosure, there is provided a computer program product for generating an automation test script. The computer program product comprises a non-transitory computer readable storage medium having program instructions embodied therewith. The program instructions are executable by a processor to cause the processor to perform following actions. Existing testing documents of a product under test can be acquired. A testing topology describing steps, containers, elements and actions of the test can be generated by extracting keywords in the existing test documents, wherein each element defines a user interface (UI) element of the product, each action defines an action attribute for an associated UI element, each container defines an operation area containing one or more UI elements, and each step defines one or more operations for one or more actions associated with one or more UI elements. An automation test script for the product can be generated based on the testing topology.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment (CPP embodiment or CPP) is a term used in the present disclosure to describe any set of one, or more, storage media (also called mediums) collectively included in a set of one, or more, storage devices that collectively include machine readable code corresponding to instructions and/or data for performing computer operations specified in a given CPP claim. A storage device is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
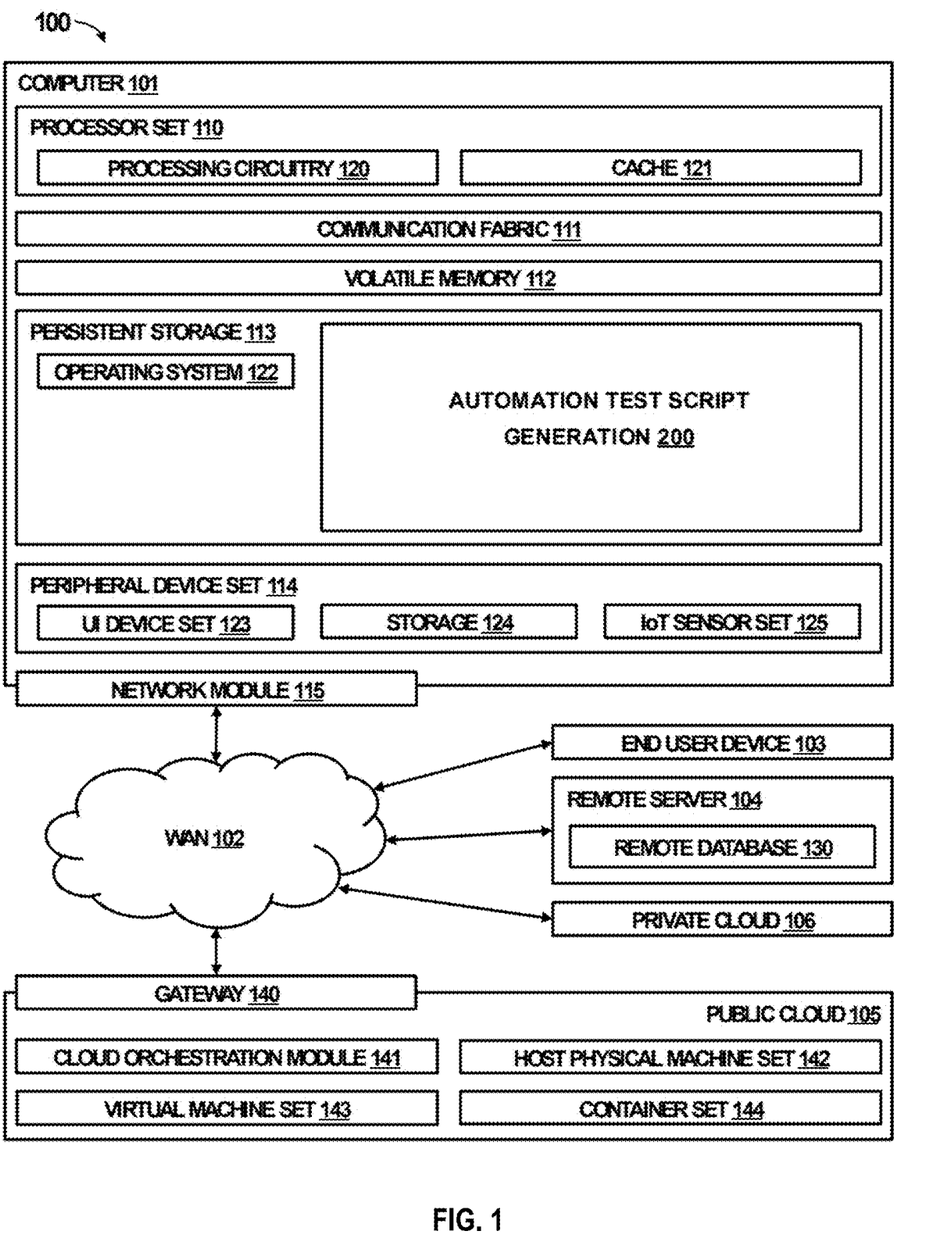
FIG. 1 shows an exemplary computing environment which is applicable to implement the embodiments of the present disclosure.

In FIG. 1, computing environment 100 contains an example of an environment for the execution of at least some of the computer code involved in performing the inventive methods, such as automation test script generation 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located off chip. In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as images. A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It is understood that the computing environment 100 in FIG. 1 is only provided for illustration purpose without suggesting any limitation to any embodiment of this disclosure, for example, at least part of the program code involved in performing the inventive methods could be loaded in cache 121, volatile memory 112 or stored in other storage (e.g., storage 124) of the computer 101, or at least part of the program code involved in performing the inventive methods could be stored in other local or/and remote computing environment and be loaded when need. For another example, the peripheral device 114 could also be implemented by an independent peripheral device connected to the computer 101 through interface. For a further example, the WAN may be replaced and/or supplemented by any other connection made to an external computer (for example, through the Internet using an Internet Service Provider).

As mentioned above, the automation test scripts for execution by the automation tool during the automation test need to be created manually, and the automation test scripts also need to be updated manually in case of any changes in the product under test, which requires significant time and effort. Due to the manual creation and/or updating of the automation test scripts, the testing work for the product has not been fully automated, which is a bottleneck in the efficiency of the testing work and the time required for the product to come into the market.

In view of the above, there exists a need for an improved automation test script generation approach to generate automation test scripts in an automatic and efficient way and to fully automate the testing work for the product.

Embodiments of the present disclosure aim to solve at least one of the technical problems described above, and propose a method, system and computer program product for automation test script generation based on parsing of existing testing documents of a product under test, such as existing test cases of the product, help documents of the product and the like. In the automation test script generation approach according to embodiments of the present disclosure, a testing topology of the test can be generated by parsing the existing test documents using a step, container, element and action (SCEA) mechanism, which will be described hereinafter. In the testing topology, key information such as steps, containers, elements and actions involved in the test can be generated by extracting corresponding keywords in the existing test documents, such that the plaintext in the existing documents can be transformed into the testing topology, which can describe the test more logically and clearly. Accordingly, the generated testing topology can be used to generate the automation test script automatically, which the automation tool will use to complete the automation test. In such a way, the product developers or test engineers do not have to draft the automation test scripts manually, which reduces the time and effort for the testing work. In addition, whenever there is a change to the products, such as in a UI of a webpage of the product, the testing topology can be updated automatically, which will then be transformed to an updated automation test script to reflect the changes in the product development in an accurate and efficient way.

Figure 2:
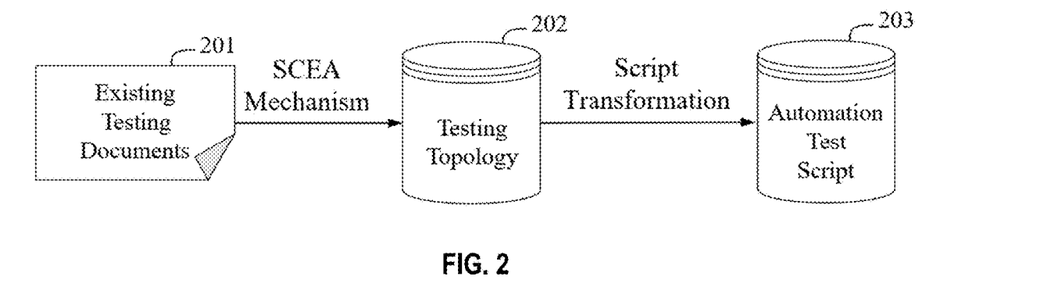
FIG. 2 depicts an exemplary architecture for automation test script generation according to an embodiment of the present disclosure.

FIG. 2 depicts an exemplary architecture for automation test script generation according to an embodiment of the present disclosure. As shown in FIG. 2, the architecture includes a database 201 storing existing test documents, a testing topology repository 202, and an automation test script repository 203.

Database 201 is configured to store existing test documents, such as existing test cases and help documents for the product under test. The existing test documents in the database 201 can be collected for various different types of products under test and can be acquired in various manners. For example, the existing test cases can include automation test scripts manually drafted by the tester according to the testing requirements of product. As another example, the existing test cases can include automation test scripts generated by recording the testing steps manually operated by the tester (such as mouse click, data entry and the like) and producing a test script that replicates the tester's manual operations. As yet another example, the existing test cases can include help documents for the product, which provide detailed instructions on the meaning of each of the UI elements (such as windows, check boxes, input box, drop-down lists and the like) and how to interact with the UI elements displayed on the UI of the product.

Testing topology repository 202 is configured to store one or more testing topologies, which can be generated by implementing a step, container, element and action (SCEA) mechanism for the existing test documents. The testing topologies in the testing topology repository 202 can be generated and maintained for various different types of products under test. For example, a testing topology can be generated by extracting keywords in the existing test documents and can describe steps, containers, elements and actions involved in the test. As described hereinafter with respect to the SCEA mechanism, each element (E) defines a UI element of the product, each action (A) defines an action attribute for an associated UI element, each container (C) defines an operation area containing one or more UI elements, and each step(S) defines one or more operations for one or more actions associated with one or more UI elements.

Automation test script repository 203 is configured to store one or more automation test scripts for the product, which can be generated by implementing the script transformation mechanism for the testing topology. The automation test scripts in the automation test script repository 203 can be generated and maintained for various different types of products under test. For example, the testing topology can be transformed to one or more operation flows corresponding to the operations required to complete the test, such that the information of nodes (e.g., nodes corresponding to interactive and non-interactive UI elements of the product) and their connection relationships in the operation flows can be used to generate the test script for execution by the automation tool based on the node information.

Figure 3:
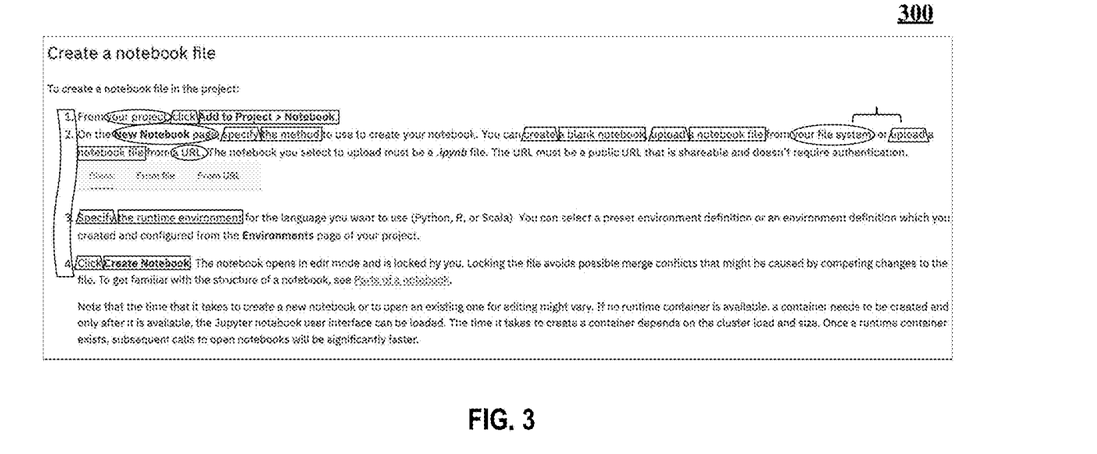
FIG. 3 depicts an example of an existing testing document according to an embodiment of the present disclosure.

FIG. 3 depicts an example of an existing testing document according to an embodiment of the present disclosure. As shown in FIG. 3, the existing testing document 300 can be a help document of the product under test. For example, the help document 300 can include detailed instructions on how to interact with each of the UI elements displayed on the UI of the product, such that the user can read the help document, follow the instructions given by the help document, and interact with an application or website efficiently. In this example, the help document 300 is related to how to create a notebook file in an application or website and may be drafted by UI designers or developers in advance in natural language.

As mentioned above, the SCEA mechanism can be implemented on the help document to parse and extract keywords in the existing test documents, and the extracted keywords corresponds to important information that is necessary to generate the automation test scripts. As can be seen in FIG. 3, the keywords related to the steps, containers, elements and actions of the test can be extracted from the document.

In embodiments of the present disclosure, keywords corresponding to steps of the test can be extracted by parsing and identifying a numerical order, an alphabetical order and the like assigned to each of a series of testing steps required to complete the test on the UI. In the example of FIG. 3, numerical orders "1", "2", "3" and "4" corresponding to the testing steps of creating a notebook file can be extracted.

In embodiments of the present disclosure, keywords corresponding to containers of the test can be extracted by parsing and identifying a preposition such as "from", "in", "on" followed by particular one or more words indicating an associated operation area such as "page", "project", "file system", "URL". According to embodiments of the present disclosure, the container can delimit a scope for one or more UI elements and corresponding actions performed on the elements. In addition, different keywords can be predetermined and preset for different types of products based on prior knowledge on the products (for example, one or more keywords specific to a product type are typically used to represent containers in the particular product type), such that keywords corresponding to the containers can be extracted based on the prior knowledge. For example, a container can correspond to a webpage of a product under test, but other examples for the container are also possible. In the example of FIG. 3, the keywords of "your project" in step "1", "New Notebook page" in step "2" and the like corresponding to the containers in the test of creating a notebook file can be extracted.

In embodiments of the present disclosure, keywords corresponding to actions of the test can be extracted by parsing and identifying a verb corresponding to an action that may be taken by a user when interacting with the UI. In the example of FIG. 3, the keywords of "click", "specify", "upload" and the like corresponding to the actions in the test of creating a notebook file can be extracted.

In embodiments of the present disclosure, the keywords corresponding to an element of the test can be extracted by parsing and identifying a noun which follows the verb corresponding to the action that may be taken by the user and is associated with interactive and visual elements (such as windows, check boxes, input boxes, drop-down lists) displayed on the UI. In the example of FIG. 3, the keywords of "Add to Project>Notebook", "a notebook file" and the like corresponding to the UI elements in the test of creating a notebook file can be extracted.

It should be noted that above descriptions about extracting keywords from the help document are only provided as an example. The keywords corresponding to the steps, containers, elements and actions of the test can be determined in various manners by performing semantic parsing on the help document.

Figure 4:
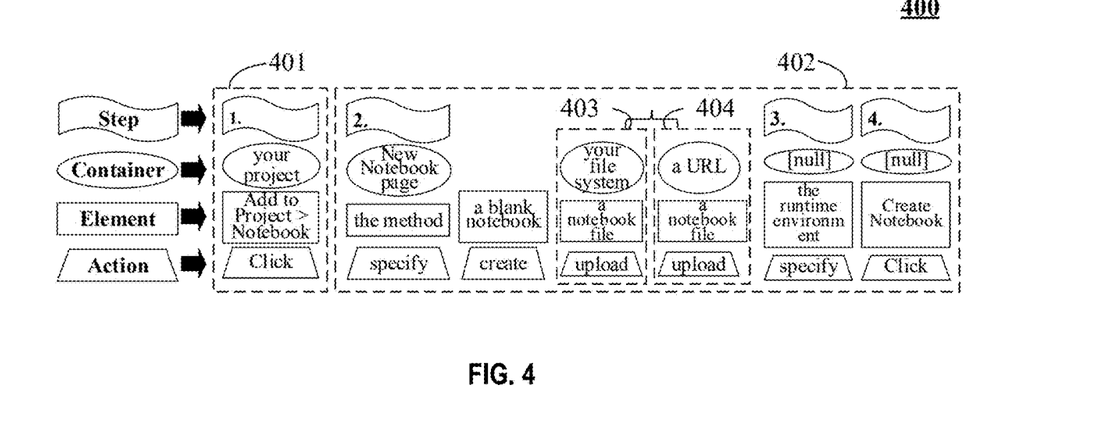
FIG. 4 depicts an example of the result of keyword extraction from an existing testing document according to an embodiment of the present disclosure.

FIG. 4 depicts an example of the result 400 of keyword extraction from an existing testing document according to an embodiment of the present disclosure. As shown in FIG. 4 and in combination with FIG. 3, by implementing the SCEA mechanism on the help document of the product, the keywords corresponding to each step(S), container (C), element (E) and action (A) of the test can be extracted.

For example, as can be seen in FIG. 4, the test can be divided into four steps numbered from "1" to "4". As shown in the dashed block 401, the step "1" involves an operation of the "click" action on the UI element "Add to Project>Notebook" in the container "your project". As shown in the dashed block 402, the step "2" can include more than one operations for more than one actions on respective UI elements, which are listed in a predetermined order of interacting with these UI elements by a tester or user when accessing the services provided by the UI. Also as shown in the dashed block 402, the steps "3" and "4" involve operations for respective actions on respective UI elements.

In addition, in the embodiment of FIG. 4, the dashed block 401 may represent a container "your project" defining an operation area containing the UI element for the step "1", while the steps "2", "3" and "4" may share a same container "New Notebook page" (i.e., a same operation area) illustrated by the dashed block 402. In addition, further as shown by the dashed blocks 403 and 404, the container "New Notebook page" can further include a container "your file system" and a container "URL" each defining an operation area containing respective UI elements.

It should be noted that the number of steps, containers, elements and actions of the test and the content thereof extracted from the existing testing document as shown in FIG. 3 and FIG. 4 are just examples of the embodiments of the present disclosure, and do not limit the embodiments of the present disclosure to the above specific form of the above examples.

Figure 5:
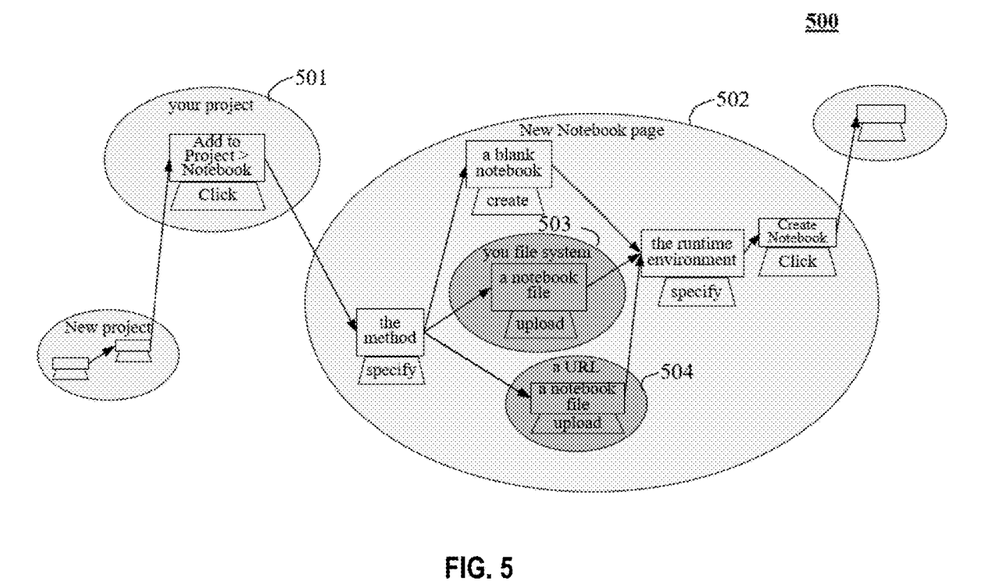
FIG. 5 depicts an example of a testing topology according to an embodiment of the present disclosure.

FIG. 5 depicts an example of a testing topology 500 according to an embodiment of the present disclosure. As shown in FIG. 5, the testing topology 500 can describe steps, containers, elements and actions of the test for the product, and it can be generated by extracting keywords in the existing test documents, as described above in combination with FIG. 3 and FIG. 4. In the testing topology 500 as shown in FIG. 5, the order of the testing steps or operations on the UI elements for the test can be reflected by the directions of the arrows. The containers involved in the test for the product can be reflected by the ellipses marked in grey, such as the containers 501-504, which correspond to the containers 401-404 in FIG. 4. In addition, more containers than those shown in FIG. 4 can be extracted and illustrated in FIG. 5, such as those containers before the container 501 and after the container 502. Each UI element can be associated with its action defining an associated action attribute (such as click, touch, drag and the like).

It can be understood there may be a huge number of steps involved in the test, and it will be beneficial to generate the testing topology for a full combination of the steps from beginning to end of the user's full interaction with the UI. According to the SCEA mechanism of the present disclosure, the existing documents can be automatically transformed into steps, containers, elements and actions of the testing topology and the relationships thereof within the topology, which can describe the test for the product as complete as possible, and can also describe the complete test more logically in an efficient manner without manual efforts.

In order to automate the generation of the automation test script, it is needed to extract the key information related to the interactive UI elements, which can be used for generating the codes in the automation test scripts for execution by the automation tool to imitate a user's action on such interactive UI elements. However, the automation test is not only directed to what a user is able or would do with the interactive UI elements of the product, but also directed to what a user is able or would see on the UI of the products, such as non-interactive UI elements.

In view of this, according to embodiments of the present disclosure, the testing topology should include not only the information for the interactive UI elements (for example, as mentioned above in FIG. 5) within the topology but also the information for the non-interactive UI elements within the topology, which will be described hereinafter in FIG. 6, FIG. 7A and FIG. 7B.

Figure 6:
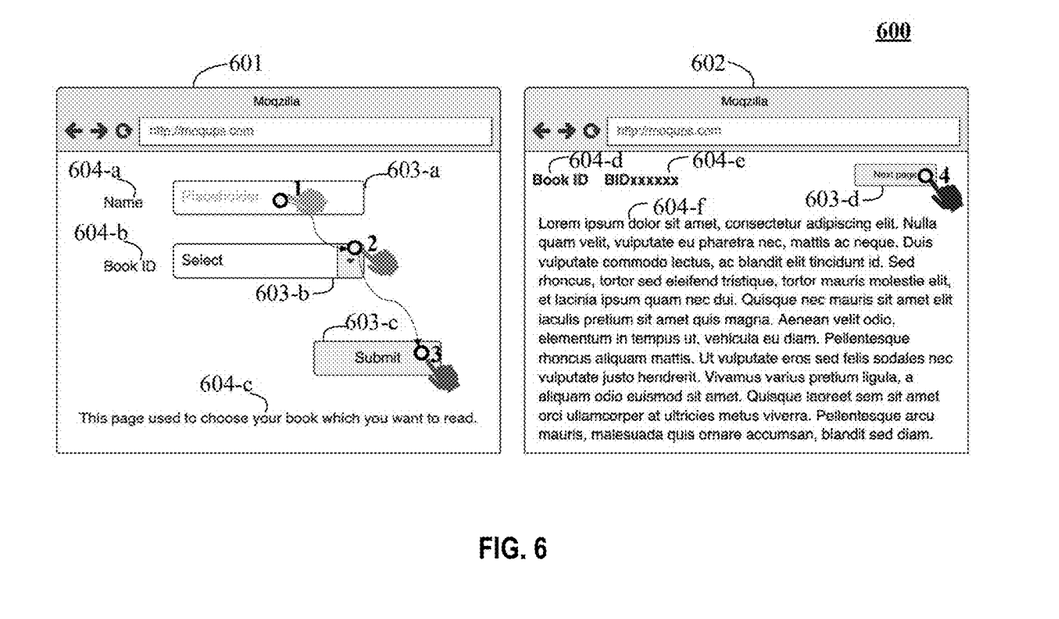
FIG. 6 depicts an example of a UI of a product under test according to an embodiment of the present disclosure.

FIG. 6 depicts an example of a UI of a product under test according to an embodiment of the present disclosure. As shown in FIG. 6, the UI 600 of the product under test is directed to electronic book reading services for users. When a user interacts with the UI, the user will firstly see a webpage 601. In order to obtain the services by interacting with the UI elements of webpage 601, the user first enters his/her name (as shown by the numerical order "1"), then the user will select a book of interest (as shown by the numerical order "2") and click the "Submit" button (as shown by the numerical order "3"). Afterwards, the user will see a webpage 602, in which the user can start reading the book of interest and turn pages of the book by clicking the "Next page" button (as shown by the numerical order "4").

It should be noted that the UI elements displayed on the webpages of UI 600 can include non-interactive UI elements or interactive UI elements. Examples of the interactive UI elements on the webpages 601 and 602 can include but not limited to the input box 603-*a*, drop-down list 603-*b*, button 603-*c* and button 603-*d*. Examples of the non-interactive UI elements on the webpages 601 and 602 can include but not limited to the text labels 604-*a*, 604-*b*, 604-*c*, 604-*d*, 604-*e*, and 604-*f*.

Figure 7A:
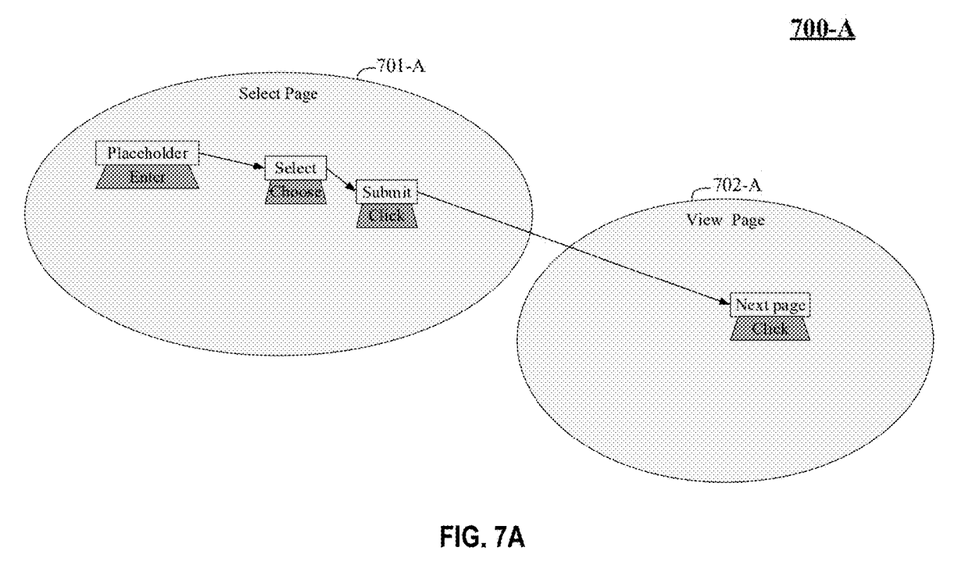
FIG. 7A and FIG. 7B depict examples of different testing topologies for a same product under test according to an embodiment of the present disclosure.
Figure 7B:
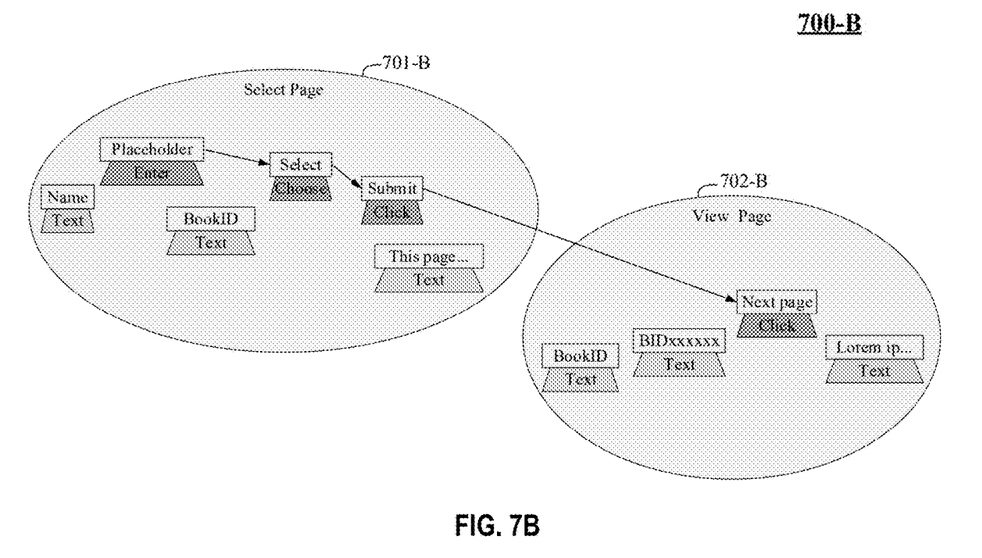

FIG. 7A and FIG. 7B depict examples of different testing topologies for a same product under test according to an embodiment of the present disclosure. According to embodiments of the present disclosure, both testing topology 700-A in FIG. 7A and testing topology 700-B in FIG. 7B are generated for the same UI 600 as shown in FIG. 6. The difference between the testing topologies lies in: the testing topology 700-A only depicts interactive UI elements and their relationships with the associated steps, containers and actions in the topology, whereas the testing topology 700-B depicts both interactive and non-interactive UI elements and their relationships with the associated steps, containers and actions in the topology.

In this example, it should be noted that the action attribute of each action for an associated non-interactive UI element is indicative of text information (e.g., text information displayed on the text labels), whereas the action attribute of each action for an interactive UI element is indicative of an operation to be taken on the UI element (such as click, drag and the like).

As shown in the testing topology 700-A of FIG. 7A, there are two containers involved in the test, for example, the container 701-A can correspond to webpage 601 of FIG. 6 while the container 702-A can correspond to webpage 602 of FIG. 6. In particular, the container 701-A can define an operation area containing the interactive UI elements (i.e., input box 603-*a*, drop-down list 603-*b*, button 603-*c*) on webpage 601, while the container 702-A can define an operation area containing the interactive UI elements (i.e., button 603-*d*) on webpage 602. In addition, there are four steps involved in the test each corresponding to an action to be taken on the interactive UI elements, and the four steps are connected in an order of performing the corresponding operations when interacting with the UI. The manner in which the testing topology 700-A of FIG. 7A is generated is similar to that is described for the testing topology 500 in FIG. 5, and details are omitted here.

As shown in the testing topology 700-B of FIG. 7B, there are also two containers involved in the test, for example, the container 701-B can correspond to webpage 601 of FIG. 6 while the container 702-B can correspond to webpage 602 of FIG. 6. As mentioned above, it is beneficial to include both interactive and non-interactive UI elements in the testing topology, so the container 701-B can define an operation area containing both interactive and non-interactive UI elements (i.e., input box 603-*a*, drop-down list 603-*b*, button 603-*c* and text labels 604-*a*, 604-*b*, 604-*c*) on webpage 601, while the container 701-B can define an operation area containing both interactive and non-interactive UI elements (i.e., button 603-*d* and text labels 604-*d*, 604-*e*, 604-*f*) on webpage 602. In addition, the steps involved in the testing topology of FIG. 7B can be connected in the same manner as FIG. 7A.

It should be noted that the non-interactive UI elements of the UI can be determined in various ways. According to embodiments of the present disclosure, after the interactive UI elements are generated by parsing and extracting keywords from the existing testing documents, a scan can be performed on the webpages of the UI under test based on the identified interactive UI elements, such that the non-interactive UI elements can also be added to the testing topology relative to the interactive UI elements. For example, the non-interactive UI element, such as the text label "Name" 604-*a*, is located near to the interactive input box "Placeholder" 603-*a*, such that as long as the input box 603-*a* is determined by parsing the existing testing documents and included in the testing topology, the text label 604-*a* can be found on the webpage and added to the testing topology accordingly.

Figure 8:
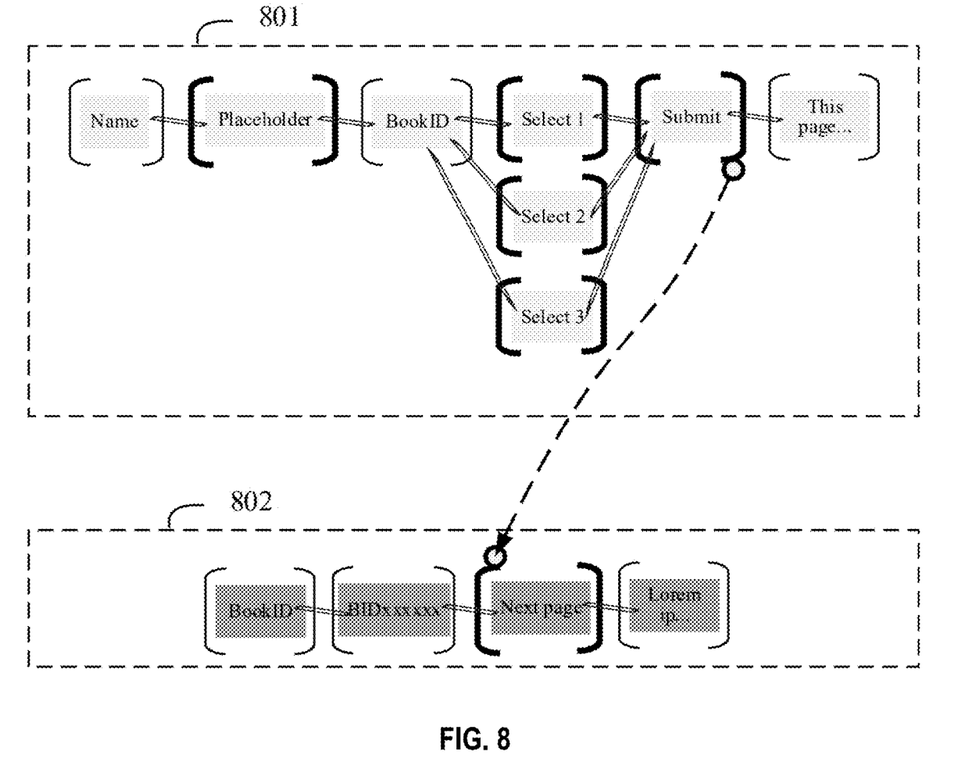
FIG. 8 depicts an exemplary view of operation flows generated based on the testing topology according to an embodiment of the present disclosure.

FIG. 8 depicts an exemplary view of operation flows generated based on the testing topology according to an embodiment of the present disclosure. As shown in FIG. 8, the exemplary view 800 includes a first operation flow 801 (which is a branched type) and a second operation flow 802 (which is a single chain type), which can be generated based on the testing topology 700-B in FIG. 7B and will be used in generating the automation test scripts.

According to embodiments of the present disclosure, the testing topology can be transformed into one or more operation flows, each of which is associated with operations in a container of the testing topology and includes one or more nodes. For example, the first operation flow 801 and second operation flow 802 can be transformed based on the testing topology 700-B, and wherein the first operation flow 801 is associated with operations in container 701-B in FIG. 7B and the second operation flow 802 is associated with operations in container 702-B in FIG. 7B, and each operation flow includes one or more nodes that are connected together.

In addition, each node of each operation flow can correspond to one UI element and the associated action in a container of the testing topology, and the one or more nodes in the one or more operation flows are connected together according to an order of the operations in the steps of the testing topology.

For example, the nodes in the operation flow 801 can correspond to the both interactive and non-interactive UI elements (i.e., input box 603-a, drop-down list 603-b, button 603-c and text labels 604-a, 604-b, 604-c) on webpage 601 of FIG. 6, and the nodes are connected together according to an order of the operations in the steps of the testing topology, e.g., in the order that a user sees and manipulates the UI elements of the webpage 601. In this example, when the webpage 601 is presented to the user, the user first reads the text label 604-a, and thus understands the meaning of the input box 603-a and is able to enter the user's name into the input box 603-a. Next, the user reads the text label 604-b, and thus understands the meaning of the drop-down list 603-b and is able to choose the book of interest by selecting in the drop-down list 603-b. Accordingly, the nodes within the operation flow 801 can be connected together according to the user's operations within that webpage 601. Similarly, the nodes within the operation flow 802 can be connected together according to the user's operations within the webpage 602 as shown in FIG. 6. According to embodiments of the present disclosure, the connections between the nodes within an operation flow can be referred to as an "actual connection".

Further as shown in FIG. 8, in addition to the "actual connection" between the nodes within an operation flow, the nodes can be connected together across different operation flows. For example, as shown by the dashed line of FIG. 8, the node of "Submit" in operation flow 801 can be connected to the node of "Next Page" in operation flow 802 based on the order of clicking the "Submit" button on webpage 601 of FIG. 6 followed by clicking the "Next page" button on webpage 602 of FIG. 6, and the connections between the nodes across different operation flows can be referred to as a "virtual connection".

Accordingly, the automation test script for the product can be generated based on the nodes and connection relationships between the nodes in the operation flows generated from the testing topology. For example, as long as the information related to the nodes can be determined, the node-related information can be passed to the automation tool such that the automation tool can interact with the UI elements automatically (such as by clicking or dragging the UI elements).

As mentioned above, there may be various changes to the product during the development lifecycle, for example, subsequent versions of the product are being developed continuously. Once there is a change in the product under test (for example, updates to the UI of the products), there is a risk that abnormal operations may occur in the automation test scripts if the scripts are not updated accordingly. For example, a node (or equivalently, a UI element) is usually associated with its location on the webpage (e.g., XPath), its action attribute (such as "click" for a button, "select" for a drop-down list, or "text" for a text label) in the automation test scripts, if the design for the UI element is changed in subsequent versions of the product, then normal tests cannot be implemented successfully because the automation test scripts are unable to locate or find the original UI elements during execution of the test scripts. In view of this, there is a requirement to maintain and update the automation test scripts once the product has been changed, in order to ensure the usability of the test script and guarantee that it is applicable to the latest version of the product. However, this may introduce additional burden to the testers for the testing work if the automation test scripts need to be updated manually.

According to embodiments of the present disclosure, whenever there is a change to the products, such as in a user interface (UI) of a webpage of the product, the testing topology can be updated automatically, which will then be automatically transformed to an updated automation test script to reflect the changes in the product development in an efficient way, without manual efforts for the update of the scripts.

Figure 9:
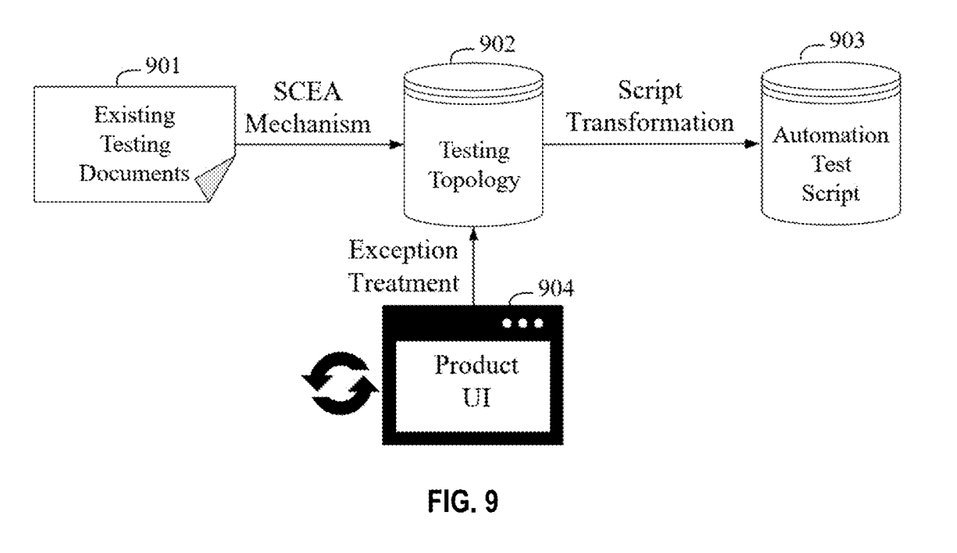
FIG. 9 depicts another exemplary architecture for automation test script generation according to an embodiment of the present disclosure.

FIG. 9 depicts another exemplary architecture for automation test script generation according to an embodiment of the present disclosure. The architecture for automation test script generation as shown in FIG. 9 is similar to that shown in FIG. 2, except that the architecture for automation test script generation of FIG. 9 further includes an exception treatment mechanism implemented for updates on the webpages of the product 904. Detailed descriptions of the components 901-903 same as those components 201-203 shown in FIG. 2 will be omitted herein.

According to embodiments of the present, updates to the product can be determined by parsing changes in a UI design document of the product. In this case, the testing topology for the product under test can be updated based on the determined updates to the product, and the automation test script for the product can also be updated based on the updated testing topology. In an example, updates to the product can be determined by identifying changes in key-value pairs of the UI elements in the UI design document.

Figure 10:
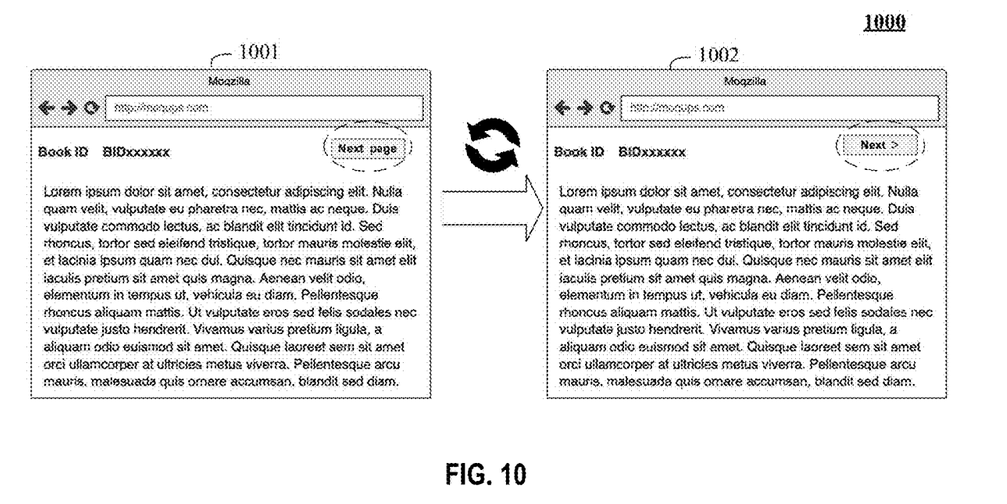
FIG. 10 depicts a schematic diagram showing an update to the UI of the product under test according to an embodiment of the present disclosure.

FIG. 10 depicts a schematic diagram showing an update to the UI of the product under test according to an embodiment of the present disclosure. As shown in FIG. 10, most parts of the UI designs for the webpage 1001 on the left side before the update and the webpage 1002 on the right side after the update are the same, with the only distinction that the text label of "Next page" on webpage 1001 is changed to "Next>" on webpage 1002 in subsequent versions of the product.

It should be noted that for each UI element of the UI, there will be a plurality of key-value pairs associated with that UI element stored in a UI design document. There can be various formats applicable to the UI design document, for example, JSON and other data-exchange formats. In this example, for the text label "Next page" or "Next>", there can be at least a first key-value pair indicating that the key "ElementType" is associated with the value "button", a second key-value pair indicating that the key "ElementXpath" is associated with a value indicating the position of the UI element within the webpage, and a third key-value pair indicating that the key "ElementLabel" is associated with the value "Next page" or "Next>". Accordingly, by comparing the key-value pairs of the UI elements in the UI design documents before and after the update, it can be determined that the first key-value pair and the second key-value pair remain unchanged, but the third key-value pair (particularly, the value for that key-value pair, i.e., the text label displayed on the UI element) is changed during the updating process for the product. In this case, the testing topology and the automation test script should be updated to account for this change in the UI design of the product.

Figure 11:
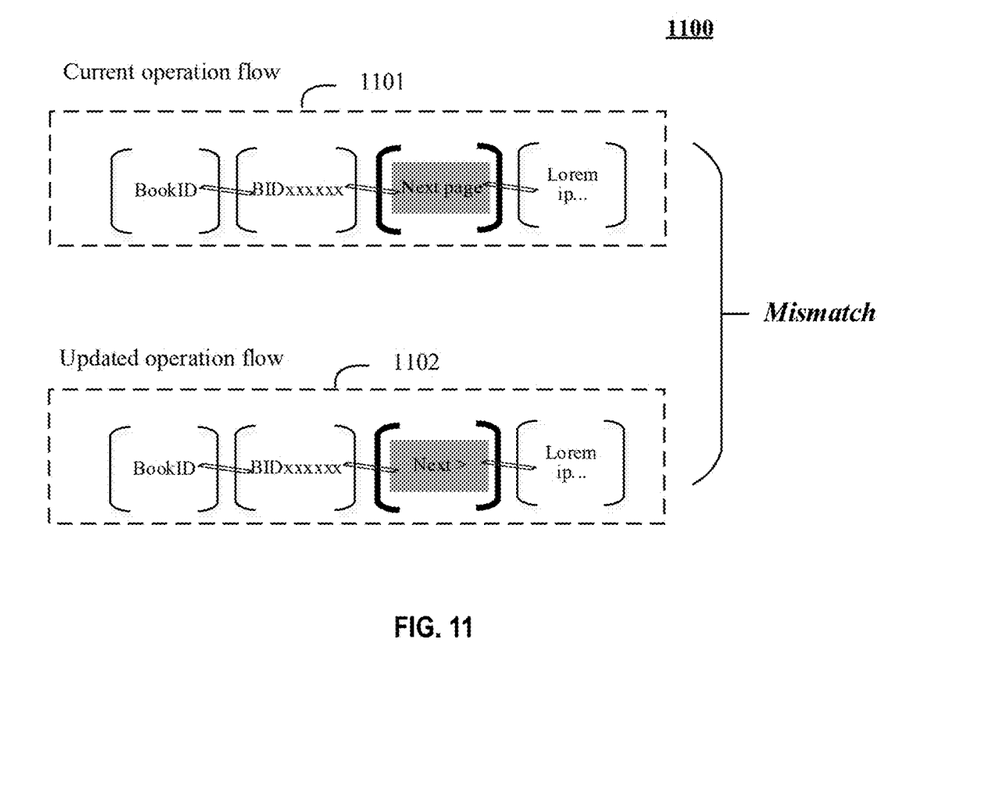
FIG. 11 depicts an exemplary architecture for updating the automation test script according to an embodiment of the present disclosure.

FIG. 11 depicts an exemplary architecture for updating the automation test script according to an embodiment of the present disclosure. According to embodiments, after the testing topology is updated based on the changes in the UI design of the product under test (e.g., by analyzing the UI documents), the updated testing topology can be transformed into one or more updated operation flows, for example, in a manner similar to those described in combination with FIG. 8. Next, a change in the one or more updated operation flows can be identified by comparing the updated operation flows with the one or more operation flows before updating. Afterwards, the automation test script for the product can be updated based on the changes identified in the updated operation flows.

As shown in FIG. 11, the operation flow 1101 corresponding to the webpage 1001 before the update can be transformed based on the current testing topology, while the operation flow 1102 corresponding to the webpage 1002 after the update can be transformed based on the updated testing topology. Based on the comparison between the operation flows before and after the update, a mismatch can be found regarding the text label of the "Next page" or "Next>" button displayed on the UI. Accordingly, the updated information for the node related to this button can be passed to the automation tool such that the automation tool can successfully locate and manipulate the UI element during the testing work.

It should be noted that in the embodiments of the present disclosure, when there is any change in the UI design, it is not needed to begin a new test script for the updated UI design, which would require additional efforts and lead to excessive consumption of the computing resources required for the generation work. Instead, the automation test script can be incrementally updated to reflect any changes in the UI design of the product and the testing topology of the product, which improves the efficiency for generating test scripts for the product up to date.

In the above example, there is only a minor change in the text label of the UI design of the product. However, in some cases, there may be significant changes for the UI design. For example, the UI designer may add additional interactive and/or non-interactive UI elements on the UI, which will require additional operations to be performed by the user during interacting with the UI. In this case, there is a possibility that not all the information required to generate the automation test script can be correctly determined by parsing changes in the UI design documents alone.

In view of this, according to embodiments of the present disclosure, the testing topology of the product and the automation test script can be updated based on additional input from the tester. For that purpose, a visualization presentation of the testing topology generated based on the existing testing documents can be provided to a tester, such that the tester can manage and maintain the testing topologies for the test efficiently. With the aid of the visualization presentation, the testers (especially a new testing engineer) can better understand the coverage of the test to be performed by viewing the visualization presentation, and update the coverage of the test by inputting edits on the content displayed in the visualization presentation.

For example, once there is any change to the product, the testing topology can be updated based on the changes in the UI design document, but as mentioned above, there is a possibility that not all the information required for the test script generation can be identified and reflected in the updated testing topology, or there is a possibility that testing topology may be updated incorrectly based on parsing on the UI design. In this case, input from the tester regarding edits on one or more of the steps, containers, elements and actions of the testing topology can be received to account for the UI changes not identified from the UI design documents or to correct the errors in the testing topology generation for the subsequent versions of the product. Accordingly, the testing topology can be further updated based on the received input, such that the automation test script can also be automatically updated to reflect the correct operations that need to be performed during the automation test.

Similarly, a visualization presentation of the operation flows generated based on the testing topology can also be provided to a tester, such that the tester can manage and maintain the operation flows for the test efficiently by viewing and updating the operation flows. In this case, input from the tester regarding edits on the nodes and the connection relationships thereof within the operation flows can be received to account for node information that is not correctly generated based on the testing topology. Accordingly, the automation test script can be updated to reflect the corrections on the node information.

Aspects of the present disclosure are described in the context of generating automation test script based on parsing on the help documents of the products. However, it should be noted that the important information required to generate the automation test script can also be generated based on the parsing on exiting test cases, such as manually drafted test scripts or test scripts generated based on the "recording" feature, as mentioned above. For example, a code parser can be used to analyze the codes in the existing test scripts written according to a particular programing language specifications or standards, such as Python.

In addition, aspects of the present disclosure are described in the context of automation test on a UI of a website or application. However, it should be noted that the embodiments of the present disclosure for generating an automation test script also apply to various testing purposes and various different types of products. The present disclosure does not restrict the types of the automation tests.

Figure 12:
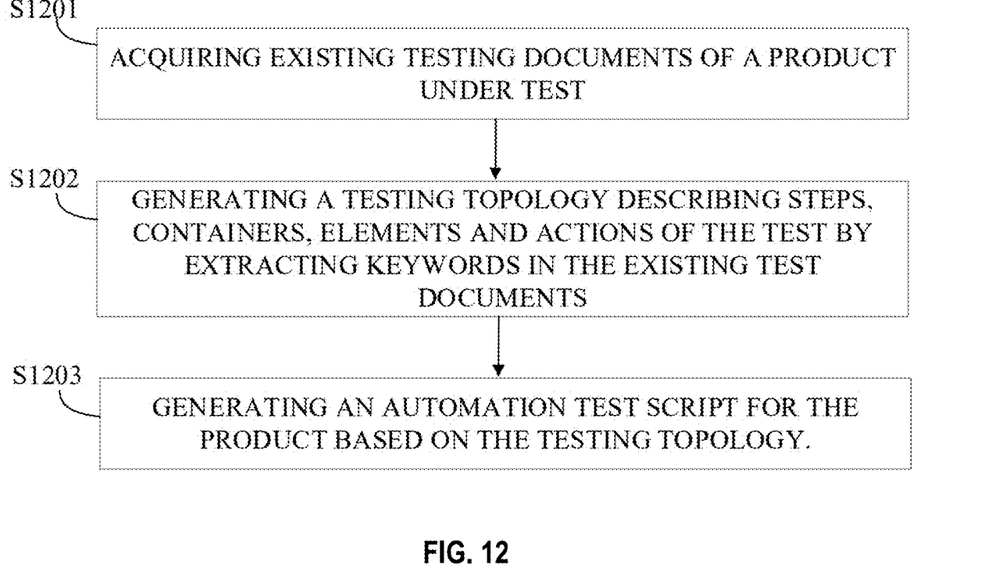
FIG. 12 shows a flowchart of a computer-implemented method of generating an automation test script according to an embodiment of the present disclosure.

FIG. 12 shows a flowchart of a computer-implemented method 1200 of generating an automation test script according to an embodiment of the present disclosure. The detailed description of method 1200 can refer to the content described in the above with respect to FIGS. 1-11. For example, method 1200 can be executed by the architecture for generating an automation test script described with respect to FIG. 2 and FIG. 9. Each step of method 1200 can be performed by one or more processing units, such as central processing unit (CPU).

With reference to FIG. 12, method 1200 comprises steps S1201-S1203. In step S1201, existing testing documents of a product under test can be acquired.

In an embodiment of the present disclosure, the existing testing documents include existing test cases and/or help documents for the product.

In step S1202, a testing topology describing steps, containers, elements and actions of the test can be generated by extracting keywords in the existing test documents. In the embodiments of the present disclosure, each element defines a user interface (UI) element of the product, each action defines an action attribute for an associated UI element, each container defines an operation area containing one or more UI elements, and each step defines one or more operations for one or more actions associated with one or more UI elements.

In an embodiment of the present disclosure, the action attribute of each action for an associated UI element is indicative of text information for a non-interactive UI element or an operation to be taken on an interactive UI element.

In step S1203, an automation test script for the product can be generated based on the testing topology.

In an embodiment of the present disclosure, the automation test script for the product can be generated by transforming the testing topology into one or more operation flows and generating the automation test script based on the nodes and connection relationships between the nodes in the operation flows. In this example, each of the operation flows is associated with operations in a container of the testing topology and includes one or more nodes, wherein each node of each operation flow corresponds to one UI element and the associated action in a container of the testing topology, and the one or more nodes in the one or more operation flows are connected together according to an order of the operations in the steps of the testing topology.

In an embodiment of the present disclosure, each of the one or more operation flows is of a single chain type or a branched type.

Optionally, the method 1200 of generating an automation test script further comprises determining updates to the product by parsing changes in a UI design document of the product; updating the testing topology based on the determined updates to the product; and updating the automation test script for the product based on the updated testing topology. In an embodiment of the present disclosure, updates to the product can be determined by determining updates to the product by identifying changes in key-value pairs of the UI elements in the UI design document.

In an embodiment of the present disclosure, the automation test script can be updated based on the updated testing topology by transforming the updated testing topology into one or more updated operation flows; identifying a change in the one or more updated operation flows compared with the one or more operation flows before updating; and updating the automation test script for the product based on the changes identified in the updated operation flows.

Optionally, the method 1200 of generating an automation test script further comprises providing a visualization presentation of the testing topology to a tester; receiving input from the tester regarding edits on one or more of the steps, containers, elements and actions of the testing topology; and updating the testing topology based on the received input.

Figure 13:
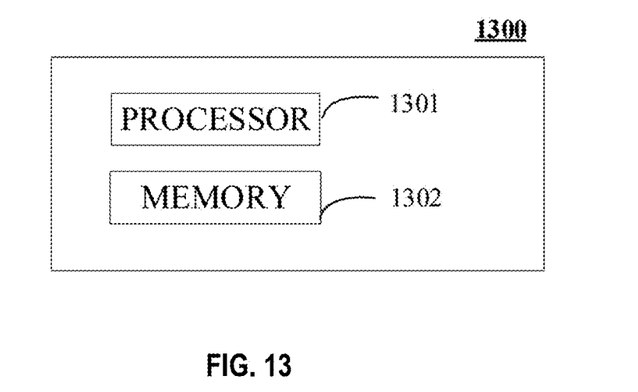
FIG. 13 shows a system of generating an automation test script according to an embodiment of the present disclosure.

FIG. 13 shows a system 1300 of generating an automation test script according to an embodiment of the present disclosure. The system 1300 of generating an automation test script comprises one or more processors 1301 and a memory 1302 coupled to at least one of the processors 1301. A set of computer program instructions are stored in the memory 1302. When executed by at least one of the processors 1301, the set of computer program instructions perform following series of actions. Existing testing documents of a product under test can be acquired. A testing topology describing steps, containers, elements and actions of the test can be generated by extracting keywords in the existing test documents, wherein each element defines a user interface (UI) element of the product, each action defines an action attribute for an associated UI element, each container defines an operation area containing one or more UI elements, and each step defines one or more operations for one or more actions associated with one or more UI elements. An automation test script for the product can be generated based on the testing topology.

In an embodiment, the generating an automation test script for the product based on the testing topology can comprise: transforming the testing topology into one or more operation flows; and generating the automation test script for the product based on the nodes and connection relationships between the nodes in the operation flows. Each operation flow is associated with operations in a container of the testing topology and includes one or more nodes, wherein each node of each operation flow corresponds to one UI element and the associated action in a container of the testing topology, and the one or more nodes in the one or more operation flows are connected together according to an order of the operations in the steps of the testing topology.

In an embodiment, the set of computer program instructions further perform the actions of determining updates to the product by parsing changes in a UI design document of the product; updating the testing topology based on the determined updates to the product; and updating the automation test script for the product based on the updated testing topology.

In an embodiment, determining updates to the product by parsing changes in a UI design document of the product can comprise: determining updates to the product by identifying changes in key-value pairs of the UI elements in the UI design document.

In an embodiment, updating the automation test script for the product based on the updated testing topology can comprise: transforming the updated testing topology into one or more updated operation flows; identifying a change in the one or more updated operation flows compared with the one or more operation flows before updating; and updating the automation test script for the product based on the changes identified in the updated operation flows.

In an embodiment, the set of computer program instructions further perform the actions of providing a visualization presentation of the testing topology to a tester; receiving input from the tester regarding edits on one or more of the steps, containers, elements and actions of the testing topology; and updating the testing topology based on the received input.

In an embodiment, the existing testing documents include existing test cases and/or help documents for the product.

In an embodiment, each of the one or more operation flows is of a single chain type or a branched type.

In an embodiment, the action attribute of each action for an associated UI element is indicative of text information for a non-interactive UI element or an operation to be taken on an interactive UI element.

In addition, according to another embodiment of the present disclosure, a computer program product for generating an automation test script is disclosed. As an example, the computer program product comprises a non-transitory computer readable storage medium having program instructions embodied therewith, and the program instructions are executable by a processor. When executed, the program instructions cause the processor to perform one or more of the above described procedures, and details are omitted herein for conciseness.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating an automation test script, comprising:
acquiring, by one or more processing units, existing testing documents of a product under test;
generating, by one or more processing units, a testing topology describing steps, containers, elements and actions of the test by extracting keywords in the existing test documents, wherein each element defines a user interface (UI) element of the product, each action defines an action attribute for an associated UI element, each container defines an operation area containing one or more UI elements, and each step defines one or more operations for one or more actions associated with the one or more UI elements, wherein the containers, elements, and actions involved in the test are generated by parsing and extracting keywords corresponding to the one or more UI elements in the existing test documents in a manner so plaintext in existing documents are transformed into the testing topology by parsing and identifying a noun which follows a verb corresponding to the action and that is associated with interactive and visual elements;
executing a scanning procedure on a webpage of a UI under the testing topology based on the one or more UI elements; and
generating, by one or more processing units, an automation test script for the product based on the testing topology.

2. The computer-implemented method of claim 1, wherein the generating an automation test script for the product based on the testing topology comprises:
transforming, by one or more processing units, the testing topology into one or more operation flows, each of which is associated with operations in a container of the testing topology and includes one or more nodes, wherein each node of each operation flow corresponds to one UI element and the associated action in a container of the testing topology, and the one or more nodes in the one or more operation flows are connected together according to an order of the operations in the steps of the testing topology; and
generating, by one or more processing units, the automation test script for the product based on the nodes and connection relationships between the nodes in the operation flows.

3. The computer-implemented method of claim 2, further comprises:
determining, by one or more processing units, updates to the product by parsing changes in a UI design document of the product;
updating, by one or more processing units, the testing topology based on the determined updates to the product; and
updating, by one or more processing units, the automation test script for the product based on the updated testing topology.

4. The computer-implemented method of claim 3, wherein the determining updates to the product by parsing changes in a UI design document of the product comprises:
determining, by one or more processing units, updates to the product by identifying changes in key-value pairs of the UI elements in the UI design document.

5. The computer-implemented method of claim 3, wherein the updating the automation test script for the product based on the updated testing topology comprises:
transforming, by one or more processing units, the updated testing topology into one or more updated operation flows;
identifying, by one or more processing units, a change in the one or more updated operation flows compared with the one or more operation flows before updating; and
updating, by one or more processing units, the automation test script for the product based on the changes identified in the updated operation flows.

6. The computer-implemented method of claim 1, further comprises:
providing, by one or more processing units, a visualization presentation of the testing topology to a tester;
receiving, by one or more processing units, input from the tester regarding edits on one or more of the steps, containers, elements and actions of the testing topology; and
updating, by one or more processing units, the testing topology based on the received input.

7. The computer-implemented method of claim 1, wherein the existing testing documents include existing test cases and/or help documents for the product.

8. The computer-implemented method of claim 2, wherein each of the one or more operation flows is of a single chain type or a branched type.

9. The computer-implemented method of claim 1, wherein the action attribute of each action for an associated UI element is indicative of text information for a non-interactive UI element or an operation to be taken on an interactive UI element.

10. A computer system for generating an automation test script, comprising:
one or more processors;
a memory coupled to at least one of the processors; and
a set of computer program instructions stored in the memory, which, when executed by at least one of the processors, perform actions of:
acquiring existing testing documents of a product under test;
generating, by one or more processing units, a testing topology describing steps, containers, elements and actions of the test by extracting keywords in the existing test documents, wherein each element defines a user interface (UI) element of the product, each action defines an action attribute for an associated UI element, each container defines an operation area containing one or more UI elements, and each step defines one or more operations for one or more actions associated with the one or more UI elements, wherein the containers, elements, and actions involved in the test are generated by parsing and extracting keywords corresponding to the one or more UI elements in the existing test documents in a manner so plaintext in existing documents are transformed into the testing topology by parsing and identifying a noun which follows a verb corresponding to the action and that is associated with interactive and visual elements;

executing a scanning procedure on a webpage of a UI under the testing topology based on the one or more UI elements; and generating an automation test script for the product based on the testing topology.

11. The computer system of claim 10, wherein the generating an automation test script for the product based on the testing topology comprises:

transforming the testing topology into one or more operation flows, each of which is associated with operations in a container of the testing topology and includes one or more nodes, wherein each node of each operation flow corresponds to one UI element and the associated action in a container of the testing topology, and the one or more nodes in the one or more operation flows are connected together according to an order of the operations in the steps of the testing topology; and generating the automation test script for the product based on the nodes and connection relationships between the nodes in the operation flows.

12. The computer system of claim 11, wherein the set of computer program instructions, when executed by the at least one of the processors, further perform actions of:

determining updates to the product by parsing changes in a UI design document of the product;

updating the testing topology based on the determined updates to the product; and updating the automation test script for the product based on the updated testing topology.

13. The computer system of claim 12, wherein the determining updates to the product by parsing changes in a UI design document of the product comprises:

determining updates to the product by identifying changes in key-value pairs of the UI elements in the UI design document.

14. The computer system of claim 12, wherein the updating the automation test script for the product based on the updated testing topology comprises:

transforming the updated testing topology into one or more updated operation flows;

identifying a change in the one or more updated operation flows compared with the one or more operation flows before updating; and updating the automation test script for the product based on the changes identified in the updated operation flows.

15. The computer system of claim 10, wherein the set of computer program instructions, when executed by the at least one of the processors, further perform actions of:

providing a visualization presentation of the testing topology to a tester;

receiving input from the tester regarding edits on one or more of the steps, containers, elements and actions of the testing topology; and updating the testing topology based on the received input.

16. The computer system of claim 10, wherein the existing testing documents include existing test cases and/or help documents for the product.

17. The computer system of claim 11, wherein each of the one or more operation flows is of a single chain type or a branched type.

18. The computer system of claim 10, wherein the action attribute of each action for an associated UI element is indicative of text information for a non-interactive UI element or an operation to be taken on an interactive UI element.

19. A computer program product for generating an automation test script, the computer program product comprising a non-transitory computer readable storage medium having program instructions embodied therewith, the program instructions executable by a processor to cause the processor to:

acquire existing testing documents of a product under test;

generating, by one or more processing units, a testing topology describing steps, containers, elements and actions of the test by extracting keywords in the existing test documents, wherein each element defines a user interface (UI) element of the product, each action defines an action attribute for an associated UI element, each container defines an operation area containing one or more UI elements, and each step defines one or more operations for one or more actions associated with the one or more UI elements, wherein the containers, elements, and actions involved in the test are generated by parsing and extracting keywords corresponding to the one or more UI elements in the existing test documents in a manner so plaintext in existing documents are transformed into the testing topology by parsing and identifying a noun which follows a verb corresponding to the action and that is associated with interactive and visual elements;

executing a scanning procedure on a webpage of a UI under the testing topology based on the one or more UI elements; and generate an automation test script for the product based on the testing topology.

20. The computer program product of claim 19, wherein to generate an automation test script for the product based on the testing topology, the program instructions executable by the processor further causes the processor to:

transform the testing topology into one or more operation flows, each of which is associated with operations in a container of the testing topology and includes one or more nodes, wherein each node of each operation flow corresponds to one UI element and the associated action in a container of the testing topology, and the one or more nodes in the one or more operation flows are connected together according to an order of the operations in the steps of the testing topology; and generate the automation test script for the product based on the nodes and connection relationships between the nodes in the operation flows.

\* \* \* \* \*